Patented July 12, 1938

2,123,749

UNITED STATES PATENT OFFICE 2,123,749

POLYAMINO-1.9-ANTHRAPYRIMIDINES AND A PROCESS OF PRODUCING THEM

Otto Schlichting, Ludwigshafen-on-the-Rhine, Germany, assignor to General Aniline Works, Inc., New York, N. Y., a corporation of Delaware No Drawing. Application June 30, 1936, Serial No. 88,113. In Germany July 12, 1935

2 Claims. (Cl. 260—32)

The present invention relates to polyamino-1.9-anthrapyrimidines and a process of producing them.

I have found that polyamino-1.9-anthrapyrimidines are obtained by causing ammonia or amines containing at least one exchangeable hydrogen atom attached to nitrogen to act on amino-1.9-anthrapyrimidine sulphonic acids while heating.

Amino-1.9-anthrapyrimidine sulphonic acids may be obtained for example by treating of amino-1.9-anthrapyrimidine or its derivatives with sulphonating agents such as sulphuric acid monohydrate or oleum at least one sulphonic group thus being introduced or by taking care during the preparation of the amino-1.9-anthrapyrimidines that the resulting compound of the anthrapyrimidine series contains at least one sulphonic group in the molecule, for example by treating a 1-aminoanthraquinonesulphonic acid having at least one further amino group with formamide whereby a sulphonic acid of an aminoanthrapyrimidine is formed. As amines suitable for the reaction may be mentioned for example alkylamines, as for example methylamine, dimethylamine, ethylamine, diethylamine, butylamine and dibutylamine, hydroxyalkylamines, as for example beta-hydroxyethylamine, beta-hydroxypropylamine and gamma-hydroxypropylamine, cycloalkylamines, as for example cyclohexylamine, arylamines, as for example aniline, paratoluidine and methylaniline, aralkylamines, as for example benzylamine and beta-phenylethylamine, and heterocyclic amines, as for example piperidine, aminopyridines and aminoquinolines.

The reaction is preferably carried out in aqueous solution or suspension at temperatures between 100° and 250° C. In order to obviate the effect of the sulphurous acid formed during the reaction, which effect is frequently injurious, it is preferable to add salts which form difficultly soluble compounds with sulphurous acid, as for example barium chloride, or oxidizing agents, such as pyrolusite, sodium nitrate, potassium chlorate, nitrobenzene or sodium nitrobenzene sulphonate.

The polyamino-1.9-anthrapyrimidines thus prepared are usually obtained in crystallized form and in good yields. They may be purified if necessary by crystallization, sublimation or by way of their salts with strong acids. In the case of some amines, as for example hydroxyethylamine, aniline, cyclohexylamine and benzylamine, it is preferable to acidify the reaction mixture with mineral acids because the excess of amine may then be readily separated while the polyaminoanthrapyrimidine remains in an almost pure form.

The polyamino-1.9-anthrapyrimidines are in part dyestuffs themselves and in part they may be used with advantage for the preparation of new dyestuffs.

The following examples will further illustrate how the said invention may be carried out in practice but the invention is not restricted to these examples. The parts are by weight.

Example 1

15 parts of 5-amino-1.9-anthrapyrimidine-2-sulphonic acid (obtainable from 1.5-diaminoanthraquinone-2-sulphonic acid by treatment with foramide) and 150 parts of 25 per cent aqueous ammonia are heated for 20 hours in a pressure-tight vessel at from 190° to 200° C. After cooling, the well crystallized 2.5-diamino-1.9-anthrapyrimidine is filtered off by suction and washed with hot water. The yield is 8.4 parts, corresponding to 70 per cent of the theoretical yield. The product melts at from 285° to 290° C. By purification by way of the sulphate or by crystallization from trichlorbenzene, needles having a violet-red tinge and a metallic lustre are obtained which melt at 295° C. The compound dissolves in concentrated sulphuric acid giving a pale violet-red coloration. By adding formaldehyde to the solution of the compound in sulphuric acid, its color is changed to orange-red; with a small amount of water, the color becomes blue-violet, with a larger amount of water it becomes violet-red and with a very large amount of water it becomes red. The compound dissolves in ethanol and ether giving a red coloration; it dissolves somewhat more readily in acetone giving an orange-red coloration; it is comparatively readily soluble in hot solvents of high boiling point, such as nitrobenzene and trichlorbenzene, giving a red coloration. Its hydrosulphite vat is yellowish red. Pale rose-colored dyeings are obtained in acetate artificial silk.

Example 2

3 parts of 5-amino-1.9-anthrapyrimidine-2-sulphonic acid and 30 parts of a 20 per cent aqueous solution of methylamine are heated at from 150° to 160° C. for ten hours in a pressure-tight vessel. After cooling, the resulting crystal pulp is filtered off by suction and washed with water; in this manner more than 80 per cent of the calculated amount of 5-amino-2-methyl-amino-1.9-anthrapyrimidine are obtained. After crystallization from trichlorbenzene, the product forms brown needles which melt at 289° C. It dissolves in concentrated sulphuric acid giving a red-violet coloration which is changed to blue by the addition of a small amount of water and to a rose color by the addition of more water. By adding formaldehyde to the solution of the compound in sulphuric acid, the coloration changes to red. The compound dissolves in acetone and trichlorbenzene giving an orange-red coloration and in ethanol and glacial acetic acid giving a bluish red coloration. The vat is orange-red. It dyes acetate artificial silk rose shades.

If a 20 percent solution of butylamine be employed instead of methylamine, the corresponding 5-amino-2-butylamino-1.9-anthrapyrimidine is obtained in the form of brown needles having a metallic lustre which melt at from 207° to 209° C. and have similar properties to 5-amino-2-methylamino-1.9-anthrapyrimidine. When employing dimethyl amine, 5 - amino - 2 - dimethyl-amino-1.9-anthrapyrimidine is obtained in the form of compact lustrous needles having a violet-red tinge which melt at from 258° to 260° C.

*Example 3*

20 parts of the 4-amino-1.9-anthrapyrimidine sulphonic acid obtainable by treating 1.4-di-aminoanthraquinone - 2 - sulphonic a c i d w i t h formamide are heated for ten hours at 200° C. in a pressure-tight vessel with 200 parts of 20 per cent aqueous ammonia. After working up, a yellow crystal powder is obtained which may be purified by crystallization from trichlorbenzene; yellow needles are thus obtained which melt at from 281° to 282° C. According to analysis the compound is a diamino-1.9-anthrapyrimidine, and it is probably 3.4-diamino-1.9-anthrapyrimidine. It dissolves in concentrated sulphuric acid giving a yellow coloration which changes to red upon the addition of water and to blue-red upon the addition of formaldehyde. It dissolves in organic solvents giving a yellow coloration with a green fluorescence. It yields yellow dyeings on acetate artificial silk.

If methylamine be employed instead of ammonia, 4-amino-3-methylamino-1.9-anthrapyrimidine is obtained in the form of orange leaflets which melt at from 291° to 292° C.

*Example 4*

30 parts of the 5-amino-1.9-anthrapyrimidine-2-sulphonic acid employed as initial material in Example 1 are heated for ten hours at from 150° to 160° C. in a pressure-tight vessel with 300 parts of 20 per cent aqueous piperidine solution. The 5-amino-2-piperidino-1.9-anthrapyrimidine obtained after working up is a violet-red crystal powder which dissolves in concentrated sulphuric acid giving a reddish coloration which changes to blue upon the addition of a small amount of water, to red-violet upon the addition of more water and to violet upon the addition of formaldehyde. It dissolves in acetone giving an orange-red coloration which changes to blue-red upon the addition of water. It dissolves in alcohol and glacial acetic acid giving a bluish red coloration and in trichlorbenzene giving a yellowish red coloration. Red dyeings are obtained therewith on acetate artificial silk.

*Example 5*

A suspension of 15 parts of pyrolusite in 15 parts of water is added to 30 parts of 5-amino-1.9-anthrapyrimidine-2-sulphonic acid in 300 parts of aqueous 20 per cent ammonia and the mixture is heated for ten hours at 200° C. in a pressure-tight vessel provided with a stirrer. After cooling, the whole is filtered by suction, washed with hot water and the pyrolusite is removed by treating the residue with sodium bisulphite solution or the residue is extracted with trichlorbenzene. There is thus obtained in a good yield 2.5 - diamino - 1.9 - anthrapyrimidine which has the same properties as the compound described in Example 1.

Other oxidizing agents, as for example nitrobenzene, sodium nitrobenzene sulphonate, sodium nitrate or potassium bromate may be employed instead of pyrolusite.

*Example 6*

A mixture of 30 parts of 5-amino-1.9-anthrapyrimidine-2-sulphonic acid, 300 parts of aqueous 25 percent ethylamine solution and 3 parts of potassium chlorate is heated for ten hours at from 150° to 160° C. in a pressure-tight vessel. After working up, 5 - amino - 2 - ethylamino-1.9-anthrapyrimidine is obtained in the form of needles having a violet-red tinge and a bronze lustre which melt at 240° C.

If diethylamine or dibutylamine be employed instead of ethylamine, the corresponding diethyl-amino or dibutylamino derivatives are obtained.

*Example 7*

30 parts of 5-amino-1.9-anthrapyrimidine-2-sulphonic acid are heated to boiling for two hours with 150 parts of beta-hydroxyethylamine while stirring. The mixture is then diluted with 300 parts of methanol, acidified with dilute sulphuric acid and the 5-amino-2-beta-hydroxy-ethylamino-1.9-anthrapyrimidine formed filtered off by suction, washed with water and dried. It forms a red-violet powder which dissolves in concentrated sulphuric acid giving a navy-blue coloration which changes to green-blue upon the addition of water, to red-violet upon the addition of more water and to red upon the addition of formaldehyde. It dissolves in acetone and alcohol giving a bluish red coloration, in glacial acetic acid giving a red-violet coloration and in trichlorbenzene giving a red coloration. The yield is 20 parts. Powerful violet-red dyeings are obtained therewith on acetate artificial silk.

Similar compounds are obtained by employing 3-hydroxypropylamine or 3-hydroxybutylamine instead of beta-hydroxyethylamine.

*Example 8*

A mixture of 20 parts of 5-amino-1.9-anthrapyrimidine-2-sulphonic acid, 30 parts of aniline and 270 parts of water is heated for 20 hours at 200° C. in a pressure-tight vessel. After cooling, the almost clear solution is acidified with hydrochloric acid; the violet precipitate deposited is filtered off by suction and washed with hot water. After drying and crystallizing from trichlorbenzene violet needles are obtained which according to analysis consist of 5-amino-2-phenylamino-1.9-anthrapyrimidine. The compound dissolves in concentrated sulphuric acid giving a green coloration which becomes blue upon the addition of a little water, red-violet upon the addition of more water and green-blue upon the addition of formaldehyde. It dissolves in alcohol and glacial acetic acid giving a bluish red coloration and in acetone and trichlorbenzene giving an orange-red coloration. Its vat is orange-red in color. It dyes acetate artificial silk brown-red shades.

If methylaniline be employed instead of aniline, 5-amino-2-(N-methyl-N-phenyl)-amino-1.9-anthrapyrimidine is obtained in the form of violet-red needles which dissolve in concentrated sulphuric acid giving a violet-red coloration, in ethanol giving a bluish red coloration, in glacial acetic acid giving a violet-red coloration, and in acetone and trichlorbenzene giving an orange-red coloration. The compound yields rose colored dyeings on acetate artificial silk.

If instead of aniline 1- or 2-aminonaphthalene are used the corresponding 5-amino-naphthylamino-1.9-anthrapyrimidines are obtained.

Example 9

20 parts of 5-amino-1.9-anthrapyrimidine-2-sulphonic acid and 200 parts of 20 per cent cyclohexylamine solution are heated for ten hours at from 150° to 160° C. in a pressure-tight vessel. After cooling, the mixture is acidified and the resulting compound is filtered off by suction and washed with cold water. The 5-amino-2-cyclohexylamino-1.9-anthrapyrimidine thus obtained is a red-violet powder which dissolves in concentrated sulphuric acid giving a green-yellow coloration which changes to blue upon the addition of a little water, to red-violet upon the addition of more water and to red upon the addition of formaldehyde. It dissolves in alcohol, acetone and trichlorbenzene giving a bluish red coloration, in glacial acetic acid giving a red-violet coloration and in pyridine giving a red coloration. It dyes acetate artificial silk rose shades.

Example 10

A mixture of 30 parts of 5-amino-1.9-anthrapyrimidine-2-sulphonic acid and 300 parts of 30 per cent benzylamine solution is heated for 20 hours at from 150° to 160° C. in a pressure-tight vessel. After cooling, the mixture is acidified with hydrochloric acid and the precipitate deposited is filtered off by suction, washed with hot water, then with dilute ammonia and finally again with water. 5-amino-2-benzylamino-1.9-anthrapyrimidine is thus obtained in the form of a red-violet powder which after crystallization from trichlorbenzene forms red needles which melt at 253° C. The compound dissolves in concentrated sulphuric acid giving a yellow coloration which almost disappears upon the addition of a little water, which becomes red-violet upon the addition of more water and which becomes green-blue upon the addition of formaldehyde. It dissolves in acetone giving an orange-red coloration, in ethanol giving a bluish red coloration, in glacial acetic acid giving a red coloration and in trichlorbenzene giving an orange-yellow coloration. The vat is orange-red. It yields yellowish red dyeings on acetate artificial silk.

What I claim is:

1. A process of producing polyamino-1.9-anthrapyrimidines which comprises heating an amino-1.9-anthrapyrimidine-2-sulphonic acid the amino group of which stands in an isocyclic nucleus with a compound selected from the class consisting of ammonia and amines containing at least one exchangeable hydrogen atom attached to nitrogen.

2. A process of producing polyamino-1.9-anthrapyrimidines which comprises heating under superatmospheric pressure an amino-1.9-anthrapyrimidine-2-sulphonic acid the amino group of which stands in an isocyclic nucleus with a compound selected from the class consisting of ammonia and amines containing at least one exchangeable hydrogen atom attached to nitrogen.

OTTO SCHLICHTING.